United States Patent
Yamamoto et al.

(10) Patent No.: US 11,142,216 B2
(45) Date of Patent: Oct. 12, 2021

(54) SEAT HAPTICS

(71) Applicant: Honda Motor Co., Ltd., Tokyo (JP)

(72) Inventors: Stuart Masakazu Yamamoto, La Mirada, CA (US); Joseph Anthony Alequin, Los Angeles, CA (US); Hartley Ochavillo, Marina Del Rey, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 16/437,184

(22) Filed: Jun. 11, 2019

(65) Prior Publication Data
US 2020/0391763 A1    Dec. 17, 2020

(51) Int. Cl.
| | |
|---|---|
| *B60W 50/16* | (2020.01) |
| *B60W 10/30* | (2006.01) |
| *B60N 2/00* | (2006.01) |
| *B60W 50/00* | (2006.01) |
| *B60N 2/90* | (2018.01) |

(52) U.S. Cl.
CPC ............ *B60W 50/16* (2013.01); *B60N 2/002* (2013.01); *B60W 10/30* (2013.01); *B60N 2002/981* (2018.02); *B60W 2050/0005* (2013.01); *B60W 2050/0014* (2013.01)

(58) Field of Classification Search
CPC ........ B60W 50/16; B60W 10/30; B60N 2/002
See application file for complete search history.

(56) References Cited

U.S. PATENT DOCUMENTS

| | | | |
|---|---|---|---|
| 8,007,043 B1 | 8/2011 | Vuong | |
| 9,463,805 B2 | 10/2016 | Kirsch et al. | |
| 9,663,004 B2 | 5/2017 | Perrin et al. | |
| 9,725,036 B1 | 8/2017 | Tarte | |
| 2011/0187520 A1* | 8/2011 | Filev | B60W 40/107 340/438 |
| 2018/0170231 A1 | 6/2018 | Song | |
| 2020/0116503 A1* | 4/2020 | Salter | B60Q 3/14 |

FOREIGN PATENT DOCUMENTS

| | | |
|---|---|---|
| DE | 102007018665 A1 | 10/2008 |
| DE | 102016009309 A1 | 2/2018 |
| JP | 4139929 B2 | 8/2000 |
| JP | 2018052358 A | 4/2018 |
| KR | 20180059052 A | 6/2018 |

* cited by examiner

*Primary Examiner* — Curtis B Odom
(74) *Attorney, Agent, or Firm* — Rankin Hill & Clark LLP

(57) ABSTRACT

Systems and techniques for managing seat haptics are described herein. A system for managing seat haptics may include a seat equipped with an actuator, a processor, and a controller. The processor may receive a signal from a vehicle system. The controller may control the actuator to operate according to a first mode at a first time and operate according to a second mode at a second time based on the signal received from the vehicle system, such as a navigation system or sensor system. The vehicle system may be a vehicle navigation system and the controller may control the actuator to operate according to the first mode, at a first frequency, and according to the second mode, at a second frequency. The first time may be during travel along a route and the second time may be when the vehicle is less than a threshold distance from a destination.

19 Claims, 8 Drawing Sheets

SEAT HAPTICS

BACKGROUND

Generally, electronics offer haptic feedback or vibrations. Many such haptic feedback systems use a type of eccentric rotating mass actuator, including an unbalanced weight attached to a motor shaft. As the shaft rotates, the spinning of this irregular mass causes the actuator, and in turn, the attached device, to shake.

BRIEF DESCRIPTION

According to one aspect, a system for managing seat haptics may include a seat equipped with an actuator, a processor, and a controller. The processor may receive a signal from a vehicle system. The controller may control the actuator to operate according to a first mode at a first time and operate according to a second mode at a second time based on the signal received from the vehicle system.

The vehicle system may be a vehicle navigation system. The controller may control the actuator to operate according to the first mode at the first time during travel of a vehicle along a route to a destination. The controller may control the actuator to operate according to the second mode at the second time. The second time may be determined to occur when the vehicle is less than a threshold distance from the destination. The first mode may be associated with a first frequency and the second mode may be associated with a second frequency.

The system for managing seat haptics may include a lighting manager controlling a lighting system to operate according to the first mode at the first time and operate according to the second mode at the second time based on the signal received from the vehicle system. The controller may control a speaker to operate according to the second mode at the second time based on the signal received from the vehicle system.

The vehicle system may be a vehicle sensor system detecting a second vehicle. The controller may control the actuator to operate according to the first mode at the first time when the second vehicle is detected. The controller may control the actuator to operate according to the second mode at the second time when the second vehicle is no longer detected. The system for managing seat haptics may include an occupant sensor detecting a presence of an occupant in the seat and information associated with the occupant. The controller may select the first mode and the second mode based on information associated with the occupant. The information associated with the occupant may include an indication of age of the occupant. The seat may be equipped with a second actuator. The controller may control the second actuator to operate according to a third mode at the first time and operate according to a fourth mode at the second time based on the signal received from the vehicle system.

According to one aspect, a system for managing seat haptics may include a seat equipped with an actuator, a processor, and a controller. The processor may receive a signal from a vehicle navigation system. The controller may control the actuator to operate according to a first mode at a first time and operate according to a second mode at a second time based on the signal received from the vehicle navigation system. The first time may be defined as a time during travel of a vehicle along a route to a destination and prior to the second time. The second time is defined as a time when the vehicle is less than a threshold distance from the destination.

The first mode may be associated with a first frequency and the second mode may be associated with a second frequency. The system for managing seat haptics may include a lighting manager controlling a lighting system to operate according to the first mode at the first time and operate according to the second mode at the second time based on the signal received from the vehicle navigation system. The controller may control a speaker to operate according to the second mode at the second time based on the signal received from the vehicle navigation system. The system for managing seat haptics may include an occupant sensor detecting a presence of an occupant in the seat and information associated with the occupant. The controller may select the first mode and the second mode based on information associated with the occupant.

According to one aspect, a system for managing seat haptics may include a seat of a first vehicle equipped with an actuator, a processor, and a controller. The processor may receive a signal from a vehicle sensor system detecting a position of a second vehicle relative to the first vehicle. The controller may control the actuator to operate according to a first mode at a first time and operate according to a second mode at a second time based on the signal received from the vehicle sensor system.

The first time may be defined as a time when the second vehicle is positioned within a threshold distance to the first vehicle and the second time may be defined as a time when the second vehicle is positioned outside of the threshold distance to the first vehicle. The system for managing seat haptics may include an occupant sensor detecting a presence of an occupant in the seat and information associated with the occupant. The controller may select the first mode and the second mode based on information associated with the occupant.

DETAILED DESCRIPTION

Figure 1:
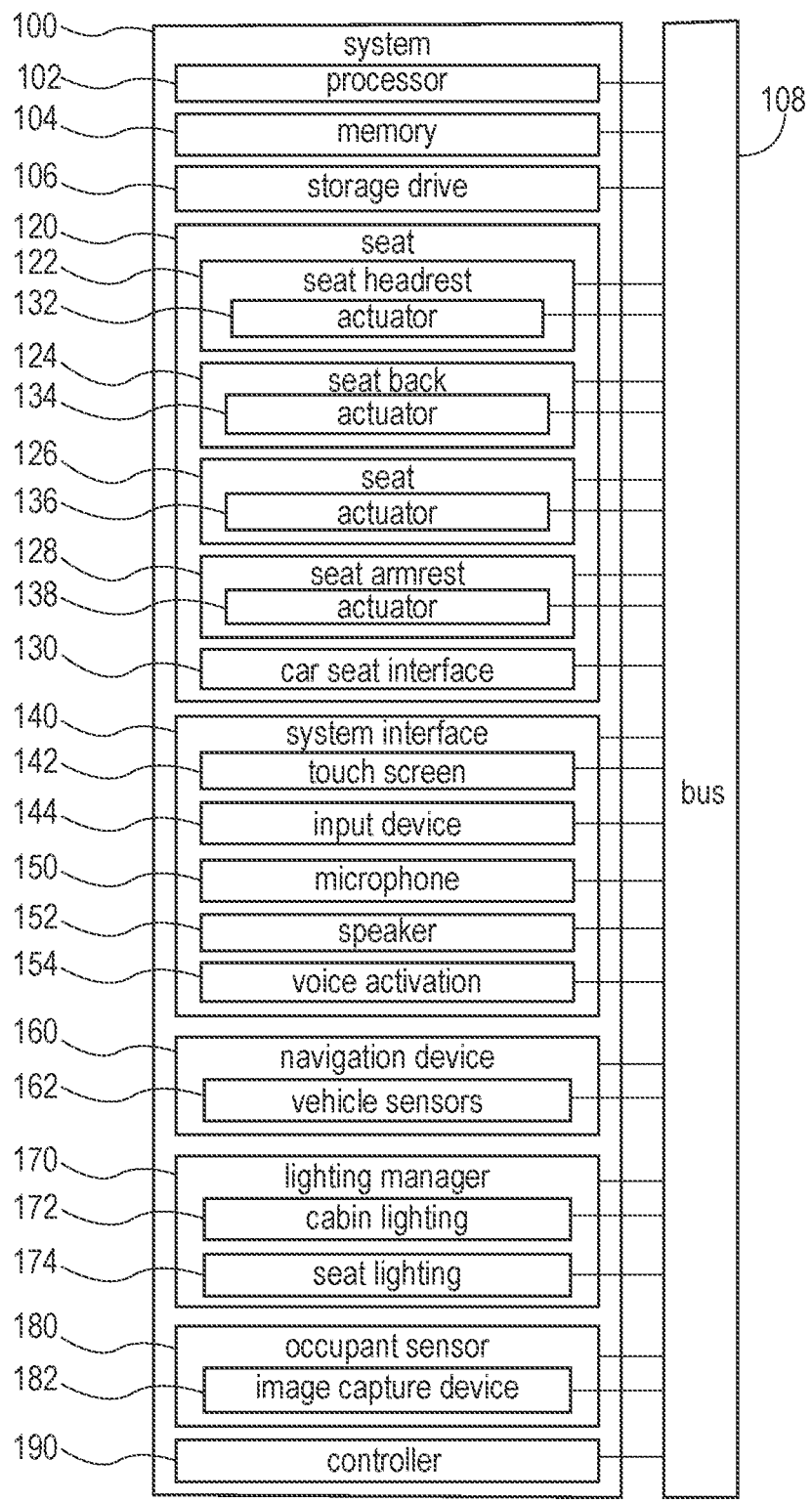
FIG. 1 is an exemplary component diagram of a system for managing seat haptics, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a vehicle navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a system 100 for managing seat haptics, according to one aspect. The system 100 for managing seat haptics may include a processor 102, a memory 104, a storage drive 106, a bus 108, and a seat 120. The seat 120 may include one or more seat portions including a seat headrest 122, a seat back 124, a seat portion 126, a seat armrest 128, and a car seat interface 130. Additionally, the seat headrest 122, the seat back 124, the seat portion 126, the seat armrest 128, and/or the car seat interface 130 may be equipped with respective actuators 132, 134, 136, 138 (e.g., a first actuator, a second actuator, a third actuator, etc.). The system 100 for managing seat haptics may include a system interface 140 which may include a touch screen 142, an input device 144, a microphone 150, a speaker 152, and a voice activation module 154. The system 100 for managing seat haptics may further include a navigation device 160, one or more vehicle sensors, a lighting manager 170 including a cabin lighting 172 device and a seat lighting 174 device, an occupant sensor 180, an image capture device 182, and a controller 190 which may include a haptic manager.

The system interface 140 may generally be utilized to receive user inputs, via the touch screen 142, the input device 144, via the microphone 150 and the voice activation module 154, etc. Examples of user inputs may include voice commands associated with navigation, such as "navigate to destination", "engage seat haptics", "disable seat haptics", "enable seat haptics for seat one", etc. In any event, the user inputs may be received by the microphone 150, processed by the voice activation module 154, and transmitted to the processor 102. The processor 102 may pass command of the actuators 132, 134, 136, 138 to the haptic manager or controller 190, which may enable or disable, initiate, or terminate vibration of one or more of the actuators 132, 134, 136, 138 at one or more frequencies.

As will be described below, the seat 120 may include the seat portion 126, which may be equipped with the actuator 136. The actuator 136 may be controlled based on a signal received from a vehicle system. For example, the actuator 136 may be controlled to operate according to a first mode at a first time and operate according to a second mode at a second time based on the signal received from the vehicle system. Although control may be described with respect to the actuator 136 within the seat portion 126, the controller 190 may be equipped or configured to control or operate any of the actuators 132, 134, 136, 138 described herein. Further, the controller 190 may control different aspects of the actuator(s) 132, 134, 136, 138, such as the frequency, the intensity, the pattern, etc. These aspects may be determined based on the signal received from the vehicle system and based on multiple signals received from different vehicle systems, according to some embodiments.

For example, the seat 120 or seat portion 126 may be equipped with a second actuator (not shown) and the controller 190 may control the second actuator to operate according to a third mode at the first time and operate according to a fourth mode at the second time based on the signal received from the vehicle system. The third mode may be the same as the first mode and the fourth mode may be the same as the second mode, according to some aspects. According to other aspects, and based on the position of the first actuator 136 and the position of the second actuator (e.g., any of 132, 134, 136, 138 or other actuators not shown), the third mode may be different than the first mode and the fourth mode may be different than the second mode. For example, the actuator 132 for the seat headrest 122 may operate according to a different 'first mode' (e.g., third mode) than the actuator 138 for the seat armrest 128.

According to one aspect, the processor 102 may receive a signal from a vehicle system information associated with the signal from the vehicle system may be stored in the memory 104 or in the storage drive 106. The vehicle system may be a vehicle navigation system 160 or a vehicle sensor system 162, for example. For example, navigation information associated with the vehicle navigation system 160 such as an origin location, a destination location, a current velocity, a current position, etc. may be stored to the memory 104 or the storage drive 106. Similarly, information from the vehicle sensors may be stored to the memory 104 or storage drive 106, such as the position of another vehicle, proximity information, a noise level in the ambient environment, etc.

According to the aspect where the vehicle system is the vehicle navigation system 160, the controller 190 may control the actuator 136 to operate according to the first mode at the first time during travel of a vehicle along a route to a destination, which may be received as the user input from the system interface 140. In other words, the first time may be defined, by the processor 102, as a time during travel of the vehicle (e.g., the first vehicle) along a first portion of the route to the destination and prior to the second time. The controller 190 may control the actuator 136 to operate according to the second mode at the second time. The second time may be determined, via the processor 102, to occur at a time when the vehicle reaches a distance less than a threshold distance from the destination. For example, when the vehicle is travelling along the first portion of the route, the controller 190 may control the actuator 136 to operate according to the first mode at the first time during travel of a vehicle along a route to a destination. The first mode may be associated with operation of the actuator 136 at a first frequency and the second mode may be associated with operation of the actuator 136 at a second frequency.

According to the aspect where the vehicle system (e.g., of a first vehicle or the vehicle) is the vehicle sensor system 162, the vehicle sensor system 162 may detect a second vehicle or presence or position information associated with the second vehicle. For example, the processor 102 may receive the signal from the vehicle sensor system 162 indicative of the position of the second vehicle relative to the first vehicle from the vehicle sensors. In this example, the controller 190 may control the actuator 136 to operate according to the first mode at the first time when the second vehicle is detected (e.g., positioned within a threshold distance to the first vehicle) and the controller 190 may control the actuator 136 to operate according to the second mode at the second time when the second vehicle is no longer detected (e.g., positioned outside of the threshold distance to the first vehicle). For example, the first mode may be associated with a first frequency which may be an increase frequency while the second mode may be associated with a second frequency which is less than the first frequency when the second vehicle is no longer detected. In this way, the increased frequency of the first mode may be provided to mitigate the effects of sounds from the second vehicle to passengers resting or sleeping in the seat, for example.

According to one aspect, the system 100 for managing seat haptics may include the occupant sensor 180. The occupant sensor 180 may detect a presence of an occupant in the seat 120 of the vehicle and other information associated with the occupant, such as a weight of the occupant. The occupant sensor 180 may include the image capture device 182, which may capture an image of the occupant of the vehicle. The processor 102 may receive the image of the occupant of the vehicle and estimate an age of the occupant or provide an indication of the age of the occupant. For example, the processor 102 may estimate the age of the occupant to be an infant age, a toddler age, a child age, a teenager, an adult age, or an elderly age, etc. based on the image from the image capture device 182. In this regard, the controller 190 may be select the first mode and the second mode based on the information associated with the occupant.

For example, if it is determined by the processor 102 that the occupant is an infant, the controller 190 may select the first mode and the second mode to facilitate or maintain sleeping and/or select transitions between modes (e.g., the first mode and the second mode), which are gentler or associated with greater transition times.

The system 100 for managing seat haptics may include a lighting manager 170 controlling a lighting system to operate according to the first mode at the first time and operate according to the second mode at the second time based on the signal received from the vehicle system. For example, the first mode for the lighting system may be associated with a dim lighting mode (e.g., associated with the vehicle travelling along the first portion of the route) and the second mode may be associated with a brighter lighting mode when the vehicle is less than the threshold distance from the destination. The lighting manager 170 may control the cabin lighting 172 of the vehicle and/or individual seat lighting 174 for each seat within the vehicle.

The system 100 for managing seat haptics may include the speaker 152. The controller 190 may control the speaker 152 to operate according to the first mode at the first time and operate according to the second mode at the second time based on the signal received from the vehicle system. For example, the first mode for the speaker 152 may be to produce white noise while the vehicle is travelling along the first portion of the route and the second mode may be associated with a waking sound when the vehicle is less than the threshold distance from the destination.

According to one aspect, the car seat interface may be an interface which enables a car seat for an infant to be communicatively coupled with the system 100 for managing seat haptics so that the system 100 for managing seat haptics may control actuation of actuators of the car seat (not shown), if any. The car seat interface may enable communication between the car seat and the system 100 for managing seat haptics via a wireless connection according to some aspects. According to other aspect, car seat interface may enable communication between the car seat and the system 100 for managing seat haptics via a wired connection (e.g., where the car seat may plug into the system 100 for managing seat haptics or the vehicle).

In this way, the controller 190 may control the actuator 136 to operate according to a first mode at a first time and operate according to a second mode at a second time based on the signal received from the vehicle system. Stated another way, the controller 190 may adjust one or more aspects (e.g., frequency of vibration, intensity of vibration, pattern of vibration, enable or disable one or more of the actuators 132, 134, 136, 138, etc.) of operation of the actuator 136 based on changes in the signal received from the vehicle system (e.g., change in location, change in speed of the vehicle, change in sensor readings of positions of other vehicles, change in detected noise level, etc.). The controller 190 may provide for gradual or incremental changes between operating modes, according to one aspect.

According to one aspect, the controller 190 may enable the system 100 for managing seat haptics based on the detected age of the occupant. For example, the system 100 for managing seat haptics may be automatically enabled when it is detected that the occupant is an infant or that the occupant is resting in a car seat. According to this aspect, the controller 190 may control the actuator 136 to operate according to the first mode (e.g., sleep vibration mode) at the first time (e.g., the first portion 402 of the trip or the second portion 404 of the trip, according to FIG. 4) and operate according to the second mode (e.g., a reduced vibration amount relative to the sleep vibration mode or no vibration at all) at the second time (e.g., associated with the third portion 406 of the trip) based on the signal received from the vehicle system, which may be the vehicle navigation system 160 and may include the location of the vehicle and the planned route, for example.

According to other aspects, the parents may, for example, enter via the system interface 140, a desired option to keep the infant sleeping towards the end of the trip or a desired option to have the infant awake at the end of the trip, and the controller 190 may operate the actuators 132, 134, 136, 138 accordingly during the last leg of the trip. Further, the system interface 140 may enable the user to define the threshold distance to the destination.

According to other aspects, the controller 190 may enable the system 100 for managing seat haptics based on the time of day, the length of the trip, a time that the occupant has been awake, a determination of whether there are other awake occupants within the vehicle (e.g., to keep the driver company), etc.

Figure 2:
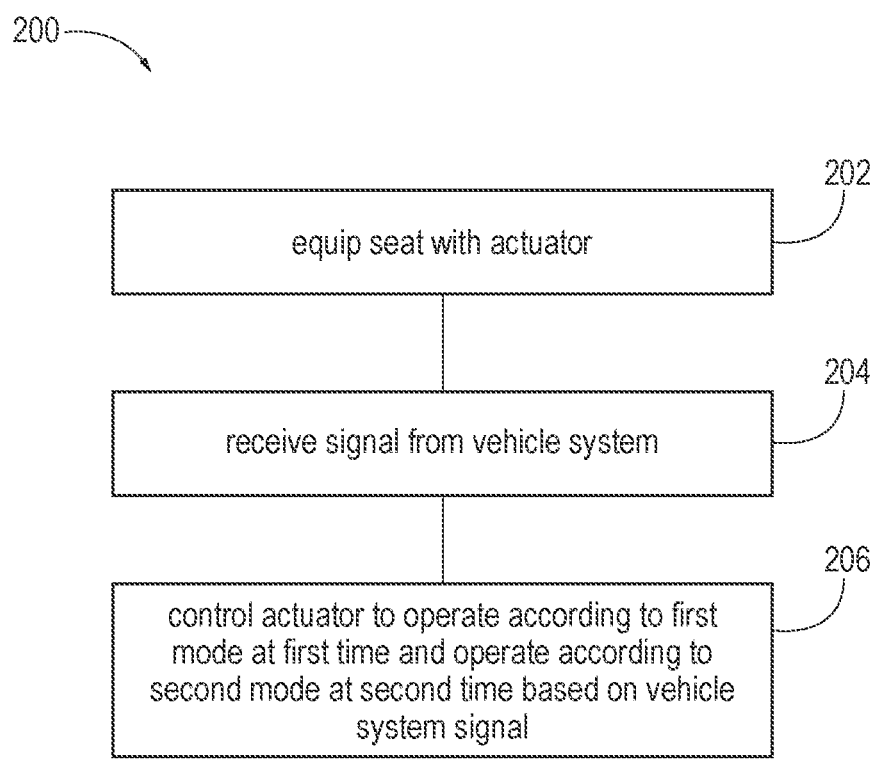
FIG. 2 is an exemplary flow diagram of a method for managing seat haptics, according to one aspect.

FIG. 2 is an exemplary flow diagram of a method 200 for managing seat haptics, according to one aspect. The method 200 for managing seat haptics may include equipping 202 a seat with an actuator, receiving 204 a signal from a vehicle system, such as a vehicle navigation system 160 or a vehicle sensor system 162, and controlling the actuator 206 to operate according to a first mode at a first time and operate according to a second mode at a second time based on the signal received from the vehicle system.

Figure 3:
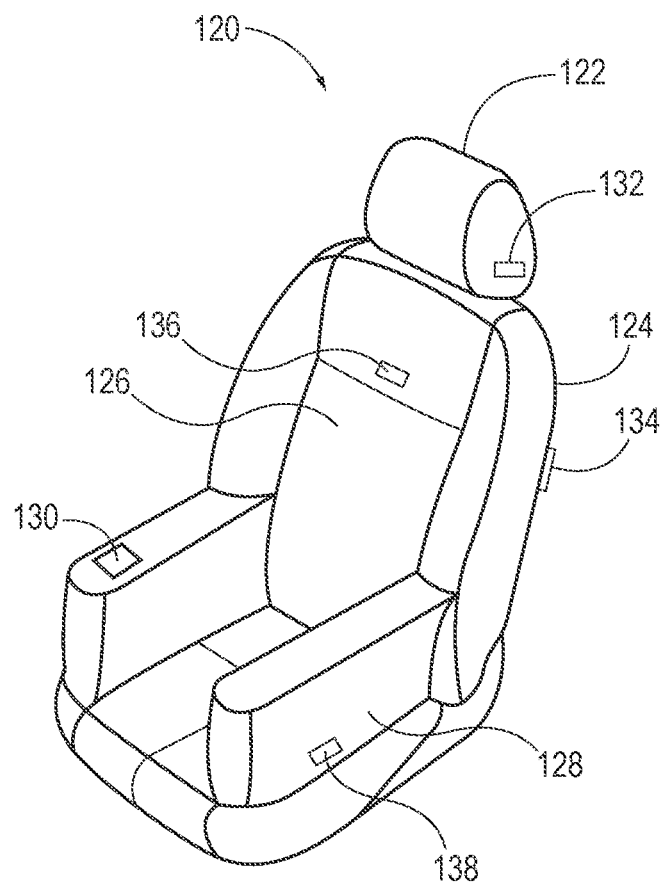
FIG. 3 is an exemplary illustration of a seat associated with the system of managing seat haptics of FIG. 1, according to one aspect.

FIG. 3 is an exemplary illustration of the seat 120 associated with the system of managing seat haptics of FIG. 1, according to one aspect. As previously discussed, the seat 120 may include the seat headrest 122, the seat back 124, the seat portion 126, the seat armrest 128, and/or the car seat interface 130. Each one of the seat portions 122, 124, 126, 128, etc. may be equipped with respective actuators 132, 134, 136, 138 which may be controlled by the controller 190 to operate according to one or more modes at one or more times based on a signal received by one or more vehicle systems.

Figure 4:
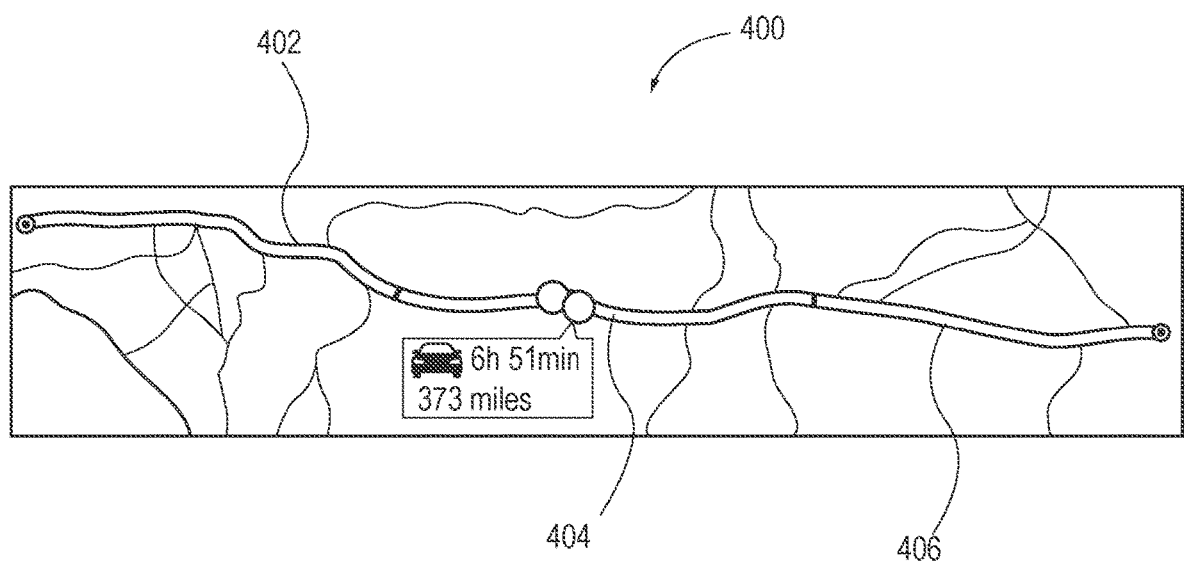
FIG. 4 is an exemplary diagram of aspects related to the system for managing seat haptics of FIG. 1, according to one aspect.

According to one aspect, the actuators 132, 134, 136, 138 of the seat 120 may be operated based on the signal from the vehicle navigation system 160 and the signal based on the vehicle sensor system 162. In this regard, FIG. 4 is an exemplary diagram of aspects related to the system 100 for managing seat haptics of FIG. 1, according to one aspect. In FIG. 4, it may be seen that the route 400 being travelled by the vehicle may include a first portion 402, a second portion 404, and a third portion 406. During each portion, the controller 190 may control the actuator 136 to operate at different frequencies or intensities (e.g., a first frequency, a first intensity, a first pattern, a second frequency, a second intensity, a second pattern, a third frequency, a third intensity, a third pattern, etc.). In this regard, the controller 190 may control the actuator 136 to operate at the first frequency, the first intensity, and the first pattern along the first portion 402 of the route 400, the second frequency, the second intensity, and the second pattern along the second portion 404 of the route 400, and the third frequency, the third intensity, and the third pattern along the third portion 406 of the route 400.

Figure 5A:
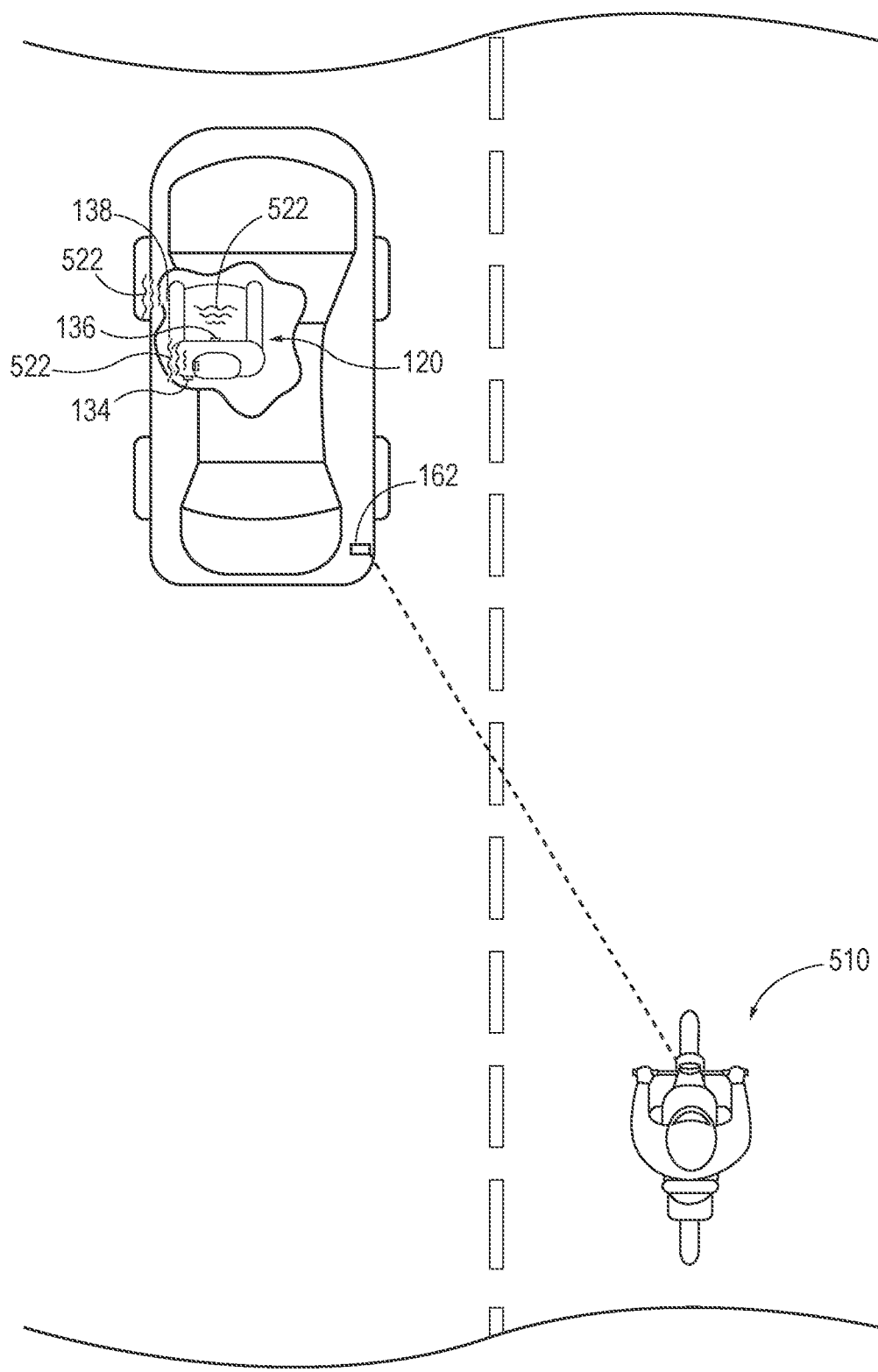
FIG. 5A is an exemplary diagram of aspects related to the system for managing seat haptics of FIG. 1, according to one aspect.
Figure 5B:
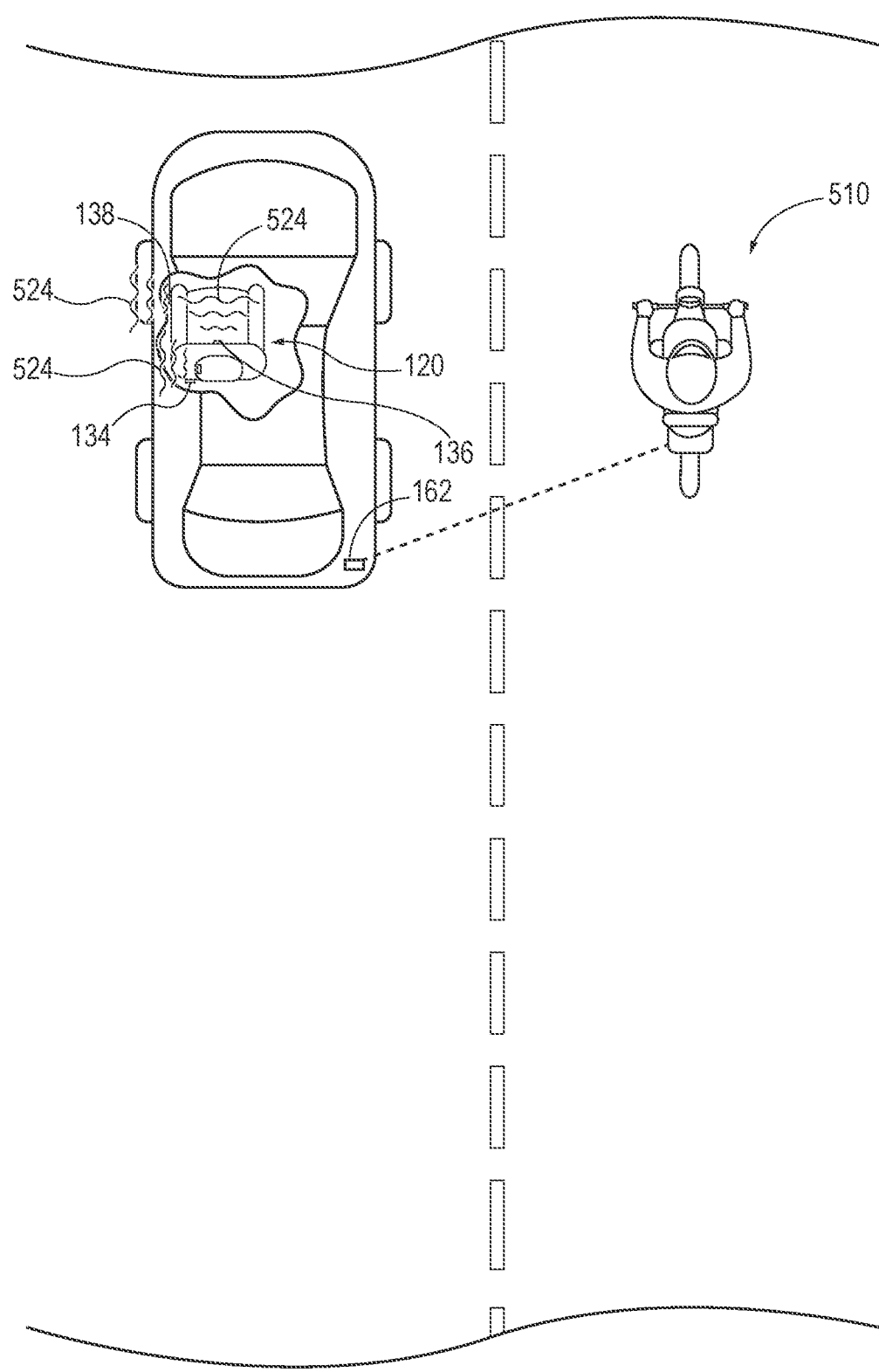
FIG. 5B is an exemplary diagram of aspects related to the system for managing seat haptics of FIG. 1, according to one aspect.

FIG. 5A is an exemplary diagram of aspects related to the system 100 for managing seat haptics of FIG. 1, according to one aspect. As seen in FIG. 5A, a motorcycle 510 is approaching a vehicle from behind, and the vehicle is equipped with the seat 120 associated with the system of managing seat haptics, including actuators 132, 134, 136, 138. In an operating mode where the signal is received from the vehicle sensor system 162, the controller 190 may control the actuators 132, 134, 136, 138 to operate at a first lesser frequency 522 when the motorcycle 510 or other detected vehicle is farther away and to operate at a second greater frequency 524 (e.g., greater than the first frequency 522, FIG. 5B) when the motorcycle 510 is detected to be within a threshold distance to the vehicle. According to another aspect, the controller 190 may control the actuators 132, 134, 136, 138 to operate at a first, lesser frequency 522 when the motorcycle 510 or other detected vehicle emits less than a threshold amount of noise and to operate at a second, greater frequency 524 (e.g., greater than the first frequency) when the motorcycle 510 is detected to emit more than the threshold amount of noise. This may be seen in FIG. 5B. In this regard, FIG. 5B is an exemplary diagram of aspects related to the system 100 for managing seat haptics of FIG. 1, according to one aspect. Here, the motorcycle 510 is closer to the vehicle and may thus be considered to be within the threshold distance or to emit greater than the threshold amount of noise relative to the vehicle, and thus, the actuators 132, 134, 136, 138 may be controlled to operate at the second, greater frequency 524.

Figure 6:
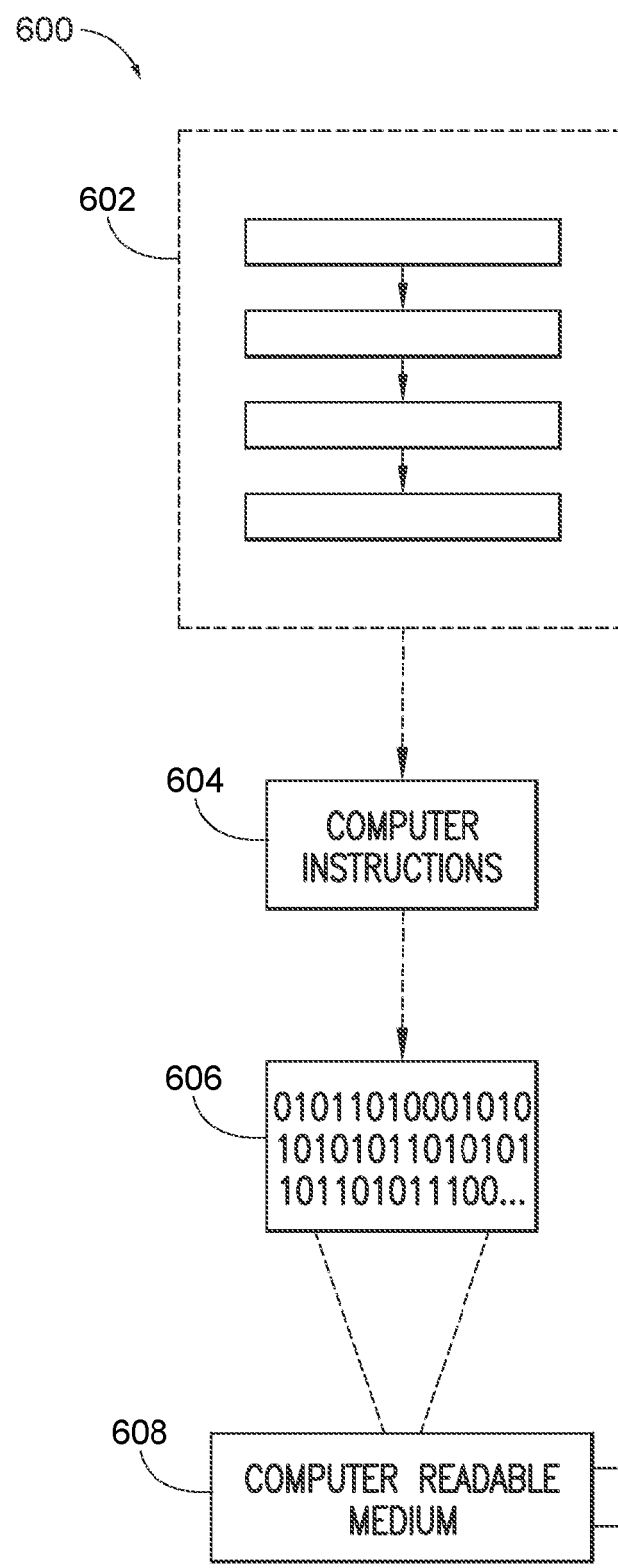
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 200 of FIG. 2. In another aspect, the processor-executable computer instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
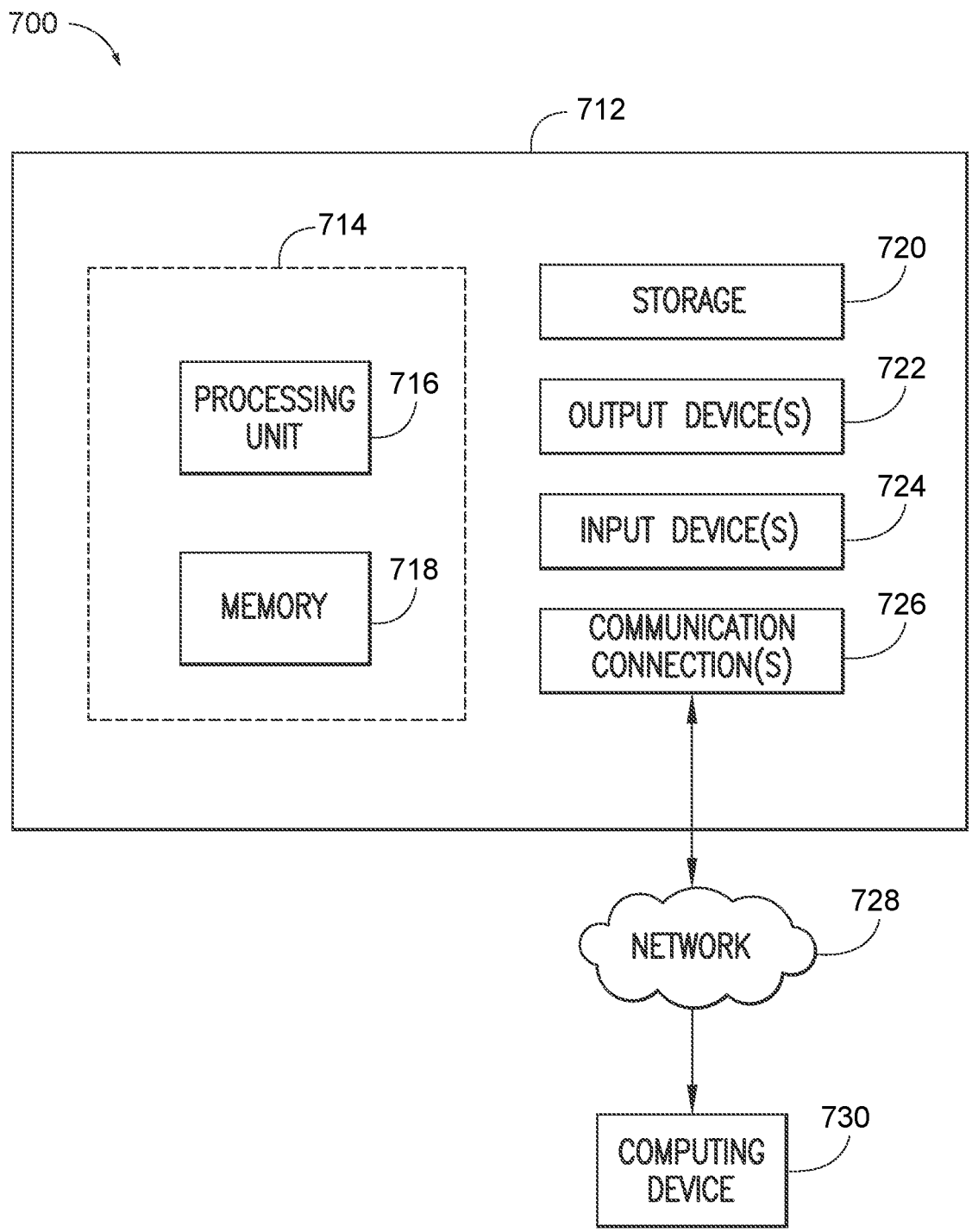
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for managing seat haptics, comprising:
a seat equipped with an actuator and a second actuator, wherein the actuator is positioned in front of the second actuator in a lateral direction;
a processor receiving a signal from a vehicle system detecting a position of a second vehicle relative to the first vehicle; and
a controller controlling the actuator and the second actuator to operate according to a first mode at a first time and operate according to a second mode at a second time based on the signal received from the vehicle system by enabling the actuator and disabling the second actuator at the first time and enabling the second actuator and disabling the actuator at the second time based on a change in position of the second vehicle relative to the first vehicle in the lateral direction.

2. The system for managing seat haptics of claim 1, wherein the vehicle system is a vehicle navigation system, and
wherein the controller controls the actuator to operate according to the first mode at the first time during travel of a vehicle along a route to a destination,
wherein the controller controls the actuator to operate according to the second mode at the second time, wherein the second time is determined to occur when the vehicle is less than a threshold distance from the destination.

3. The system for managing seat haptics of claim 1, wherein the first mode is associated with a first frequency and the second mode is associated with a second frequency.

4. The system for managing seat haptics of claim 1, comprising a lighting manager controlling a lighting system to operate according to the first mode at the first time and operate according to the second mode at the second time based on the signal received from the vehicle system.

5. The system for managing seat haptics of claim 1, wherein the controller controls a speaker to operate according to the second mode at the second time based on the signal received from the vehicle system.

6. The system for managing seat haptics of claim 1, comprising an occupant sensor detecting a presence of an occupant in the seat and information associated with the occupant.

7. The system for managing seat haptics of claim 6, wherein the controller selects the first mode and the second mode based on information associated with the occupant.

8. The system for managing seat haptics of claim 6, wherein the information associated with the occupant includes an indication of age of the occupant.

9. The system for managing seat haptics of claim 1, wherein the seat is equipped with a second actuator, and
wherein the controller controls the second actuator to operate according to a third mode at the first time and operate according to a fourth mode at the second time based on the signal received from the vehicle system.

10. A system for managing seat haptics, comprising:
a seat equipped with an actuator and a second actuator, wherein the actuator is positioned in front of the second actuator in a longitudinal direction;
a processor receiving a signal from a vehicle navigation system and a signal from a vehicle system detecting a position of a second vehicle relative to the first vehicle; and
a controller controlling the actuator and the second actuator to operate according to a first mode at a first time and operate according to a second mode at a second time based on the signal received from the vehicle navigation system by enabling the actuator and disabling the second actuator at the first time and enabling the second actuator and disabling the actuator at the second time based on a change in position of the second vehicle relative to the first vehicle in the longitudinal direction, wherein the first time is defined as a time during travel of a vehicle along a route to a destination and prior to the second time, and wherein the second time is defined as a time when the vehicle is less than a threshold distance from the destination.

11. The system for managing seat haptics of claim 10, wherein the first mode is associated with a first frequency and the second mode is associated with a second frequency.

12. The system for managing seat haptics of claim 10, comprising a lighting manager controlling a lighting system to operate according to the first mode at the first time and operate according to the second mode at the second time based on the signal received from the vehicle navigation system.

13. The system for managing seat haptics of claim 10, wherein the controller controls a speaker to operate according to the second mode at the second time based on the signal received from the vehicle navigation system.

14. The system for managing seat haptics of claim 10, comprising an occupant sensor detecting a presence of an occupant in the seat and information associated with the occupant.

15. The system for managing seat haptics of claim 14, wherein the controller selects the first mode and the second mode based on information associated with the occupant.

16. A system for managing seat haptics, comprising:
a seat of a first vehicle equipped with an actuator and a second actuator, wherein the actuator is positioned in front of the second actuator in a longitudinal direction;

a processor receiving a signal from a vehicle sensor system detecting a position of a second vehicle relative to the first vehicle; and a controller controlling the actuator and the second actuator to operate according to a first mode at a first time and operate according to a second mode at a second time based on the signal received from the vehicle sensor system by enabling the actuator and disabling the second actuator at the first time and enabling the second actuator and disabling the actuator at the second time based on a change in position of the second vehicle relative to the first vehicle in the longitudinal direction.

17. The system for managing seat haptics of claim 16, wherein the first time is defined as a time when the second vehicle is positioned within a threshold distance to the first vehicle and the second time is defined as a time when the second vehicle is positioned outside of the threshold distance to the first vehicle.

18. The system for managing seat haptics of claim 16, comprising an occupant sensor detecting a presence of an occupant in the seat and information associated with the occupant.

19. The system for managing seat haptics of claim 18, wherein the controller selects the first mode and the second mode based on information associated with the occupant.

* * * * *